United States Patent Office

3,850,846
Patented Nov. 26, 1974

3,850,846
CATALYST SULFIDING PROCEDURE
Stanley Kravitz, Joseph H. Coone, Jr., and Edward L. Cole, Fishkill, N.Y., assignors to Texaco Inc., New York, N.Y.
No Drawing. Filed Apr. 19, 1973, Ser. No. 352,802
Int. Cl. B01j 11/74
U.S. Cl. 252—439                           9 Claims

ABSTRACT OF THE DISCLOSURE

In situ sulfiding of catalysts is effected by charging a mixture of a catalyst and an encapsulated solid sulfur-containing compound to a reaction zone, heating the mixture to remove the encapsulating material and then converting the sulfur in the solid, sulfur-containing compound to $H_2S$.

---

This invention relates to the preparation of catalysts. More particularly, it is concerned with the conversion of catalysts to the sulfide form.

In the carrying out of various catalytic reactions such as, for example, hydrogenation, reforming and the like, perhaps one of the most popular methods of conducting the reaction is to pass the reactants either in vapor or liquid form or a mixture thereof through a bed of particulate catalyst. Generally the catalyst is composed of catalytic material as, for example, one or more of a metal, metal oxide or metal sulfide distended on a refractory inorganic oxide support which may be substantially inert such as alumina or may of itself have catalytic properties such as silica or mixtures thereof with alumina. In addition to the amorphous refractory inorganic oxide, the support may also contain a crystalline inorganic oxide such as a crystalline aluminosilicate or zeolite.

The final step in the preparation of a catalyst is usually a calcining step so that in many cases the catalyst when sold commercially or initially loaded into a reactor is in the form of the metal oxide. However, there are many occasions where it is desirable to have the catalytic material in the form of the sulfide. This is particularly true in the case of specific reactions such as hydrocracking where the metal sulfide is much more selective in producing desired products than is the metal oxide. There are also other situations where the fresh catalyst, in either the metal or metal oxide form, is highly reactive during the initial stages of the on-stream period to such an extent that a considerable amount of cracking with the concomitant deposition of coke on the catalyst takes place. As a result there is a substantial reduction in conversion as the reactant material cannot come in with the catalyst because of the coating of carbon thereon. To avoid this initial "superactivity" of the catalyst with subsequent rapid deactivation the catalyst may be converted to the sulfide form. In this way, at the beginning of the on-stream period the sulfided catalyst has a lower activity than the unsulfided catalyst and consequently at the beginning of the on-stream period the formation of carbon is avoided. Gradually through erosion of the sulfur from the catalyst as the on-stream period progresses the catalyst will be restored to its usual activity. However, by this time the unit has been on stream for a period of time sufficient to extend beyond the "superactivity period" of the catalyst.

Conventionally unsulfided catalysts have been sulfided by the manufacturer or sulfided "in situ" after being charged to the reactor by passing a stream of hydrogen or inert gas through a bed of the catalyst particles at elevated temperature and introducing therewith a volatile sulfiding agent such as $H_2S$, $CS_2$, methyl mercaptan and other low molecular weight sulfur-containing compounds. While this procedure is satisfactory to the extent that sulfur is added to the catalyst, it is unsatisfactory in that after the sulfiding of the catalyst has been effected, a large amount of gas comprising sulfur-containing compounds must be treated for removal of the sulfur as sulfur-containing gases, for ecological reasons, may no longer be discharged to the atmosphere. In addition, this method of sulfiding the catalyst is unsatisfactory in that the catalyst is not uniformly sulfided since that portion of the catalyst close to the point of entry of the sulfiding agent becomes oversulfided whereas that portion of the catalyst nearest the outlet of the reactor is undersulfided.

It is an object of the present invention to convert unsulfided catalyst in situ to the sulfided form. Another object of the invention is to convert an unsulfided catalyst to the sulfided form without having the problem of removing large amounts of sulfur-containing compounds from the sulfiding gas. Still another object of the present invention is to effect in situ sulfiding of a catalyst bed whereby the sulfiding takes place substantially uniformly throughout the bed. These and other objects will be obvious to those skilled in the art from the following disclosure.

According to our invention, there is provided a process for the in situ sulfiding of catalytic material which comprises forming a substantially uniform mixture of said catalytic material and a solid sulfur-containing compound, converting the sulfur in said solid sulfur-containing compound into a volatile sulfur-containing compound and maintaining said volatile sulfur-containing compound in contact with said catalytic material for a period of time sufficient to effect reaction therebetween thereby converting at least a portion of said catalytic material to the sulfide form.

The catalysts to be treated by the process of our invention may comprise any catalytic material which can be used advantageously in the sulfide form. Such catalytic materials include Group VIII metals or their compounds such as the noble metals, for example, platinum, palladium and the like, iron group metals, for example, nickel, cobalt and iron and mixtures thereof and Group VI metals, for example, molybdenum and tungsten. Suitably, the catalytic metal or metal compound is distended on a support which may either be inert or may have catalytic activity. The support generally comprises an amorphous refractory inorganic oxide such as silica, alumina, magnesia, titania, zirconia and the like and mixtures thereof. In addition to the amorphous oxide the support may also comprise a crystalline inorganic oxide of the aluminosilicate or zeolite type. Examples of catalysts which can be converted to the sulfide form by the process of our invention are platinum on alumina catalyst containing 0.4 wt. percent platinum and nickel-tungsten on a mixture of silica alumina and decationized zeolite Y containing about 6% nickel and 20% tungsten by weight on a support composed of 22 wt. percent decationized zeolite Y, 20 wt. percent alumina and 58 wt. percent silica.

Preferably, when the sulfiding technique of the present invention is employed the catalyst is contained within a closed vessel as a fixed bed of catalyst particles. The particles may be in the shape of extrudates, pellets, spheroids or cylindroids and generally have a minimum dimension of about 1/16 inch and a maximum dimension of about 3/4 inch. Preferably the catalyst is in the form of extrudates or pellets having dimensions ranging from 1/16 inch to 1/2 inch.

The solid sulfur-containing compounds used in the process of our invention comprise those compounds which may be converted to volatile sulfur-containing compounds. Examples of suitable solid compounds are the sulfides of aluminum, magnesium, cesium, strontium, barium, lithium and sodium. Aluminum sulfide is preferred as it is easily converted to hydrogen sulfide by hydrolysis and simultaneously leaves the substantially inert $Al_2O_3$ as residue.

The sulfur-containing compound may be mixed directly with the catalytic material. In a preferred embodiment the solid sulfur-containing compound is loaded into the reaction zone simultaneously with the catalyst particles. Still more preferably, the solid sulfur-containing compound is encapsulated prior to being mixed with the catalyst. The encapsulating material may be any easily decomposable substance which does not leave a residue which may have a deleterious effect on the catalyst. Suitable encapsulating materials are wax, gelatin, low melting polymers and the like. Ordinarily the capsules are prepared to contain between about 0.5 and 4.0 grams of the solid material. However, this may be varied depending on the size of the catalyst bed and the extent of the sulfidation desired.

The conversion of the solid sulfur-containing compound into a volatile sulfur-containing compound is effected preferably by contacting the solid compound with steam. The sulfiding of the catalyst may be accomplished by closing or sealing the reactor vessel after the catalyst and the sulfur-containing compound, e.g. a metal sulfide have been loaded into the reactor and then pressuring the reactor vessel with steam or a gas containing water vapor. If the sulfur-containing solid compound is encapsulated the temperature should be sufficiently high to either melt or decompose the encapsulating material. If the sulfiding step is preceded by a reducing step, then hot hydrogen may serve to free the solid compound from the encapsulating material. Steam may then be injected into the hydrogen or the vessel may be depressured and steam alone or steam diluted with a gaseous material may be introduced into the reactor vessel to hydrolyze the metal sulfide with the production of hydrogen sulfide as the volatile sulfur-containing compound.

As mentioned above, the solid sulfur-containing compound, e.g. the metal sulfide is used preferably in encapsulated form as this prevents its degradation during periods of handling and also precludes any possible chance of the hazardous escape of hydrogen sulfide while a reactor is being loaded.

The following example is submitted for illustrative purposes only:

EXAMPLE

Anhydrous aluminum sulfide is crushed to lumps of approximately ¼ inch in size. The crushed material is sprayed with hot wax and then chilled to give the granules of aluminum sulfide a moisture-resistant coating.

For the platinum on alumina naphtha reforming catalyst to be loaded to the reforming reactor, the manufacturing specifications call for initial sulfiding of the catalyst to a level of 0.3 wt. percent sulfur. The encapsulated aluminum sulfide is charged to the reactor simultaneously with the platinum on alumina reforming catalyst. Each drum of catalyst pellets contains about 300 lbs. of catalyst and to distribute the aluminum sulfide substantially uniformly throughout the catalyst bed, three lbs. of aluminum sulfide is loaded to the reactor with each drum of catalyst. The unit is then closed and a pressure release valve is set for 500 p.s.i.g. to prevent excessive pressure buildup during the sulfiding.

In the ordinary course of handling, the platinum on alumina reforming catalyst takes up about 2 wt. percent of moisture which is sufficient to effect in situ release of hydrogen sulfide. Actually one lb. of water is sufficient to release all of the available hydrogen sulfide from 2.5 lbs. of aluminum sulfide. Thus in the instant example in which 20,000 lbs. of catalyst is loaded to the reactor, the catalyst contains about 400 lbs. of water which is sufficient to react with the 180 lbs. of aluminum sulfide introduced into the reactor with the catalyst.

The bed of catalyst plus aluminum sulfide is then heated to 400° F. and held at this temperature for four hours. By raising the temperature to this level the wax coating of the aluminum sulfide melts thereby permitting water vapor produced by the heating of the catalyst to react with the aluminum sulfide and produce pure hydrogen sulfide in situ. Substantially all of the hydrogen sulfide is consumed in the sulfiding of the catalyst and an inert residue of alumina remains after the decomposition of the aluminum sulfide. The reforming catalyst has a substantially uniform sulfur content of approximately 0.3 wt. percent and essentially all of the hydrogen sulfide produced has been consumed in the sulfiding leaving no hydrogen sulfide to present either a pollution problem or a recovery problem. The reactor temperature may then be raised to reforming temperature and the catalytic reforming commenced.

Obviously, various modifications of the invention as hereinbefore set forth may be made without departing from the spirit and scope thereof, and therefore, only such limitations should be made as are indicated in the appended claims.

We claim:

1. A process for the in situ sulfiding of a catalyst which comprises charging a mixture of a particulate catalyst comprising a Group VIII metal oxide on a support comprising a refractory inorganic oxide and encapsulated hydrolyzable solid sulfur-containing compound to a reaction zone to form a catalyst bed therein, heating the mixture to remove the encapsulating material from said compound, hydrolyzing said compound to produce $H_2S$ within said catalyst bed thereby effecting in situ sulfiding of said catalyst.

2. The process of Claim 1 in which the catalyst comprises platinum and alumina.

3. The process of Claim 1 in which said solid sulfur-containing compound is selected from the group consisting of sulfides of aluminum, magnesium, cesium, strontium, barium, lithium and sodium.

4. The process of Claim 3 in which the sulfide is aluminum sulfide.

5. The process of Claim 1 in which the encapsulating material is wax.

6. The process of Claim 1 in which the encapsulating material is a low melting polymer.

7. The process of Claim 1 in which the encapsulating material is gelatin.

8. The process of Claim 1 in which the encapsulating material is removed by heating the mixture to a temperature above the melting point of the encapsulating material.

9. The process of Claim 8 in which the encapsulating material is wax and the mixture heated to a temperature of about 400° F.

References Cited

UNITED STATES PATENTS

| 3,563,912 | 2/1971 | Young | 252—430 |
|---|---|---|---|
| 1,390,683 | 9/1921 | Ellis | 252—430 |
| 2,976,253 | 3/1961 | Edwards | 252—430 |
| 3,224,962 | 12/1965 | Baldwin | 252—439 X |
| 3,453,217 | 7/1969 | Kozlowski et al. | 252—439 X |
| 3,720,627 | 3/1973 | Jarvis | 252—439 X |

PATRICK P. GARVIN, Primary Examiner

U.S. Cl. X.R.

252—430